United States Patent [19]
Lutz

[11] Patent Number: 6,036,411
[45] Date of Patent: Mar. 14, 2000

[54] METHOD OF PRODUCING AN ARTICLE

[76] Inventor: Dean Lutz, 11 Leslie Street, East Ipswich, Queensland 4305, Australia

[21] Appl. No.: 09/065,924

[22] Filed: Apr. 24, 1998

[30] Foreign Application Priority Data

Sep. 11, 1997 [AU] Australia .................................. PP 0479

[51] Int. Cl.⁷ ........................................................ B23C 1/00
[52] U.S. Cl. ........................ 409/131; 29/898.066; 451/55
[58] Field of Search ..................................... 409/131, 132; 451/52, 55; 408/19; 29/559, 33 R, 898.066, 894.323, 446

[56] References Cited

U.S. PATENT DOCUMENTS

| | | | |
|---|---|---|---|
| 2,709,324 | 5/1955 | Hull | 451/55 |
| 2,913,859 | 11/1959 | Koch | 451/52 |
| 3,465,481 | 9/1969 | Szwarcman | 451/55 |
| 3,685,216 | 8/1972 | Frey et al. | 451/554 |
| 4,304,034 | 12/1981 | Trevarrow | 29/894.323 |
| 5,218,764 | 6/1993 | Suzuki | 29/898.066 |
| 5,833,518 | 11/1998 | Young | 451/53 |

FOREIGN PATENT DOCUMENTS

| | | | |
|---|---|---|---|
| 212535 | 10/1957 | Australia | 29/446 |
| 3305668 A1 | 9/1983 | Germany | 451/55 |
| 361219559 | 9/1986 | Japan | 451/55 |
| 80002525 | 11/1980 | WIPO | 451/55 |

*Primary Examiner*—William Briggs
*Attorney, Agent, or Firm*—John C. Thompson

[57] ABSTRACT

A method of machining an article including the steps of providing a resilient article having a lower face with a predetermined profile and an upper face; providing a reference article with an upper face having a reference profile; abutting at least part of the lower face against the reference article upper face and applying force to resiliently deform the resilient article a predetermined amount whereby the lower face of the resilient article substantially conforms to the shape of the reference article upper face; machining the upper face of the resilient article to a predetermined configuration; releasing the force applied to deform the resilient article whereby the upper face of the resilient article deforms to adopt a desired configuration.

22 Claims, 7 Drawing Sheets

METHOD OF PRODUCING AN ARTICLE

FIELD OF THE INVENTION

The present invention is particularly applicable to dragline slew bearings and their manufacture.

BACKGROUND OF THE INVENTION

One of the most critical mechanical components of a dragline is the main slew bearing. It enables the boom and machinery house and its supporting structure (the rotating frame) to rotate about a vertical axis of the tub running on the main slew bearing. Typically the slew bearing has a set of upper and lower tracks with cylindrical rollers similar in construction to a large roller thrust bearing. A typical bearing would be approximately 15 meters in diameter with one hundred and twenty rollers of about 300 mm in diameter and 250 mm long carrying a total rotating load of around 2,700 tonnes. The upper and lower tracks are formed by rail segments each of the same length except for two specials and a short piece. When all the rail segments are placed together they form a full circle.

FIG. 1 shows a slew bearing construction consisting of a tub 11 having upper and lower pairs of roller tracks (rails) 12, $12^1$, 13, $13^1$, each pair with a roller 14, 15 located therebetween. A rotating frame 16 is located on the upper rails 12', 13'.

Because of the high compressive loads transmitted by the bearing, circumferential vertical plate diaphragms are located directly beneath and above the roller path. The rotating frame accepts concentrated loads at the boom feet and mast feet and also under heavy machinery items such as hoist and drag drums, motor generator sets and the like. Ideally the tub should have relatively uniform loading along its underside, however this does not occur when sitting on uneven ground or isolated large rocks. Furthermore, stiffness in these structures does have the adverse effect of acting to prevent load equalisation between rollers where there are internal irregularities in the bearing. The inability of the bearings to adequately compensate for internal distortions is a major factor in determining their surface life. It follows therefore that bearings and consequently rails need to be replaced. Because of the loads which are carried by the slew bearing rails it is important that they are made with a high degree of precision so as to ensure the maximum possible life before replacement. Replacement of slew bearing rails is an arduous and time consuming task which can cost a mining operation millions of dollars in downtime.

As previously discussed each rail is formed by a number or rail segments. Each rail segment has a frusto-conical upper surface (the surface which is to contact the roller). Typically a rail forming full circle includes twenty four main rail segments plus a short piece in the roller removal area. Of these twenty two are identical, each covering 15° of an arc. The remaining 30° is covered by two rails about 13.4° and 13.7° respectively plus the short piece of about 2.8° of arc.

Typically the diameter of the "slew circle" measured to the effective centre of the rails when put together is 14 meters. FIG. 2 shows a typical example of a rail segment in which the base width 33 is approximately 406 mm. The width of the top face or roller bearing face 21 is approximately 228.6 mm. The inner side flange 22 has a height of approximately 36 mm which is the same as the height of the outer flange 23.

The upper face 21 typically slopes downwardly at an angle of just over 1°.

Because of the precision required with each of the rail segments, machining the top face of the rail to required specifications is extremely difficult considering that the taper for each rail segment must be flat when determined in a section taken radially. Because current machining techniques do not enable a repeatable machining process of the upper surface of each rail. Each rail will have surface imperfections which must be made within tolerance guidelines. Typically the upper surface will have rises and falls which can be reduced by hand finishing but without altering the general profile. The present invention provides an alternative method of producing rail segments and may have broader applications.

SUMMARY OF THE INVENTION

According to the present invention there is provided a method of machining an article including the steps of providing a resilient article having a lower face with a predetermined profile and an upper face;

providing a reference article with an upper face having a reference profile;

abutting at least part of the lower face against the reference article upper face and applying force to resiliently deform the resilient article a predetermined amount whereby the lower face of the resilient article substantially conforms to the shape of the reference article upper face;

machining the upper face of the resilient article to a predetermined configuration;

releasing the force applied to deform the resilient article whereby the upper face of the resilient article deforms to adopt a desired configuration.

It is preferred that the resilient article comprises a metal rail segment.

The rail segment is preferably in the form of machinable steel.

The resilient article may be made of a metal having a toughness greater than the metal of the reference article.

It is preferred that the resilient article lower face has a substantially planar profile.

Preferably the resilient article upper face is machined to a planar profile.

The resilient article may comprise clamping portions which permit the resilient article to be clamped to the reference article.

The clamping portions preferably comprise shoulder portions above the lower face.

The shoulder portions may be located on opposite sides of the upper face.

The resilient article may be an elongate member with the shoulder portions being longitudinal stepped side portions (side flanges).

It is preferred that the upper face is narrower than the lower face.

The reference article may be in the form of a jig.

The reference may comprise locating means for locating the resilient article on the upper face.

Preferably the locating means comprises side walls.

The side walls are preferably adapted to receive clamping means for clamping the shoulder portions.

The clamping means may comprise a plurality of clamps located on each side wall and distributed to apply pressure to the resilient article at intervals along the length thereof.

The upper face of the reference article may provide a substantially arcuate profile.

The substantially arcuate profile is preferably frusto-conical.

It is preferred that when the force applied to deform the resilient article is released the upper face deforms to a configuration substantially the same as the inverse of that defined by the upper face of the reference article.

It is preferred that the upper face comprises a plurality of stepped surfaces whereby the resilient article is adapted to be supported on the corner of each step.

It is preferred that each corner of the plurality of stepped surfaces together define points on a curve, which curve shape, the resilient article is adapted to conform to when deformed by applying pressure to opposite sides thereof.

The upper face preferably comprises a plurality of stepped arcuate surfaces.

The upper face may define a frusto-conical surface.

The side walls may comprise upper and lower side walls.

The top surface of each side wall preferably comprises holes for receipt of shafts of the clamps.

The holes may be threaded for receipt of threaded shafts of the clamps.

According to one embodiment the upper face of the reference article has a curvature of approximately 1°.

It is preferred that the resilient article is an arcuate shaped segment having inner and outer flanged portions.

Each clamping element may comprise a threaded bolt and a clamping element which is adapted to clamp a portion of one side flange, the clamping element being located below the head of the clamping bolt.

According to one embodiment the method includes the step of providing a base member to support the reference article.

It is preferred that the base member comprises a channel configured to receive the base of the reference article whereby the reference article can be seated within the channel.

It is preferred that the base member has channel walls to help locate the reference article within the channel.

The base member preferably comprises hydraulic cylinders which are arranged along the walls of the channels with their cylinders directed upwardly so as to contact an underside of an outer portion of the clamping element.

It is preferred that a hydraulics cylinder is provided for each clamping element.

It is preferred that the method comprises a step of abutting the lower face of the resilient article against edges of arcuate steps.

Preferably the step of applying force includes clamping shoulder portions of the resilient article to deform, bend or deflect the reference article.

It is preferred that the clamping step includes screwing the bolts of each clamp into the matching holes of the reference article side walls.

The step of clamping may also include the step of operating each hydraulic cylinder to provide a counterbalance to the outer end of each clamping element to balance the force applied to the reference article at the inner end of the clamping element.

It is preferred that the machining step includes machining the upper face of the resilient article to a flat or planar finish.

It is preferred that the method includes the step of locating the reference article in the channel of the base member.

According to the preferred embodiment the resilient article is a slew bearing rail, the reference article is a conical jig insert and the base member is a jig base.

According to another embodiment of the present invention the step of applying force to resiliently deform the resilient article includes the step of applying a magnetic force of attraction to the lower face of the resilient article.

Preferably the reference article includes a plurality of conical magnetic transfer blocks which together define the shape of the reference article upper face.

BRIEF DESCRIPTION OF THE DRAWINGS

A preferred embodiment of the present invention will now be defined by way of example only with reference to the accompanying drawings which include.

DETAILED DESCRIPTION OF THE DRAWINGS

As previously described a slew bearing segment has a flat lower base and an upper face which slopes downwardly radially at a slight angle from the innermost end 24 to the outermost end 25. The exact angle of this slope is determined by the requirements of the slew bearing.

Forming the described profile of the top face 21 is the most difficult part of producing each slew bearing segment.

Figure 1:
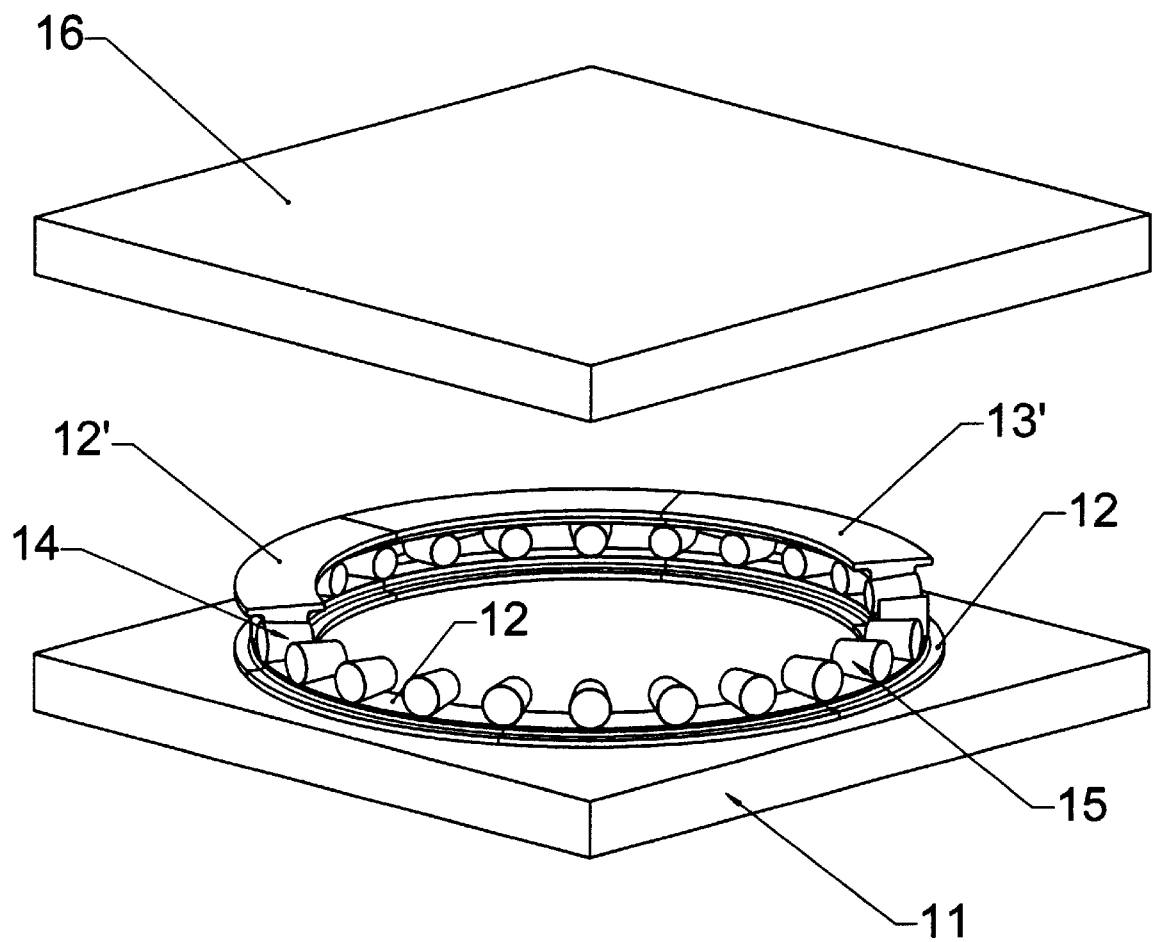
FIG. 1 which shows a diagrammatical view of a slew bearing construction.
Figure 2:
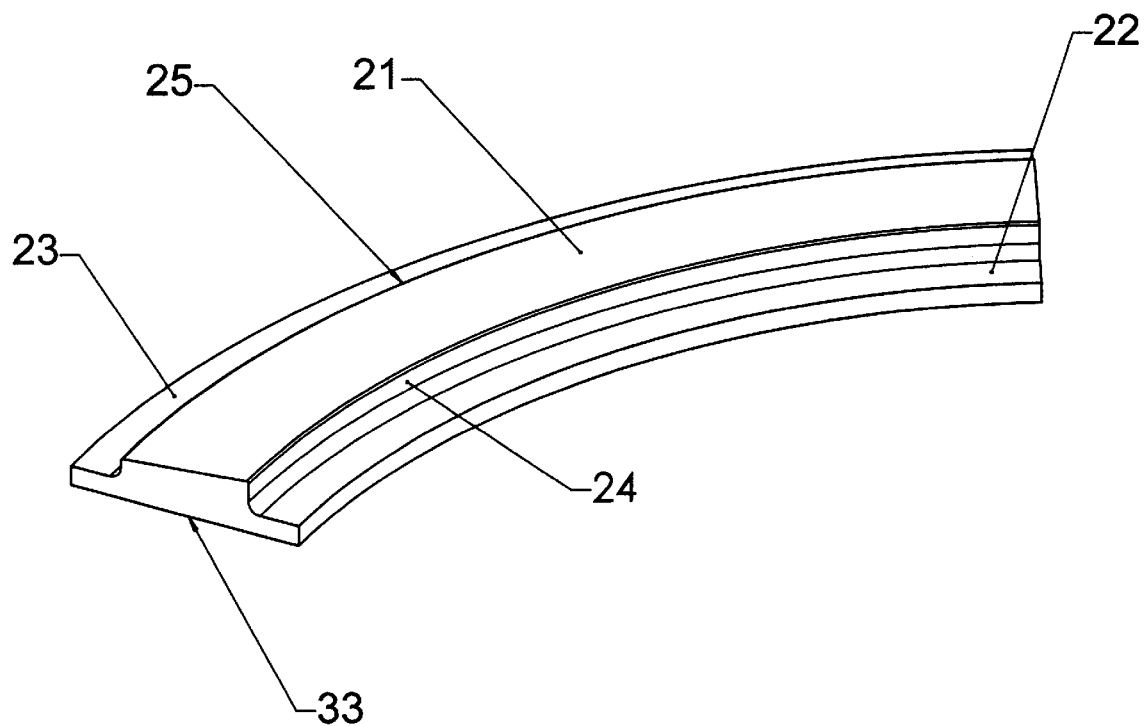
FIG. 2 which shows an angled view of a rail according to the present invention.

According to the preferred embodiment a rough machined bearing segment 30 is produced which still requires the final machining step of forming the upper face 32 to its desired frusto-conical profile. As shown in FIG. 2 the lower face 33 is already machined flat which is a relatively easy exercise while the overall shape of the bearing segment 30 can be produced by conventional extrusion or moulding techniques.

Because of the difficulty of using machining techniques to form a frusto-conical surface the first embodiment provides a method of forming the surface which firstly requires the provision of a standardised element which incorporates the desired frusto-conical surface and can be used as a frame of reference repeatedly in order to produce a substantially identical surface on the upper face 32 of the bearing segment 30.

Figure 3:
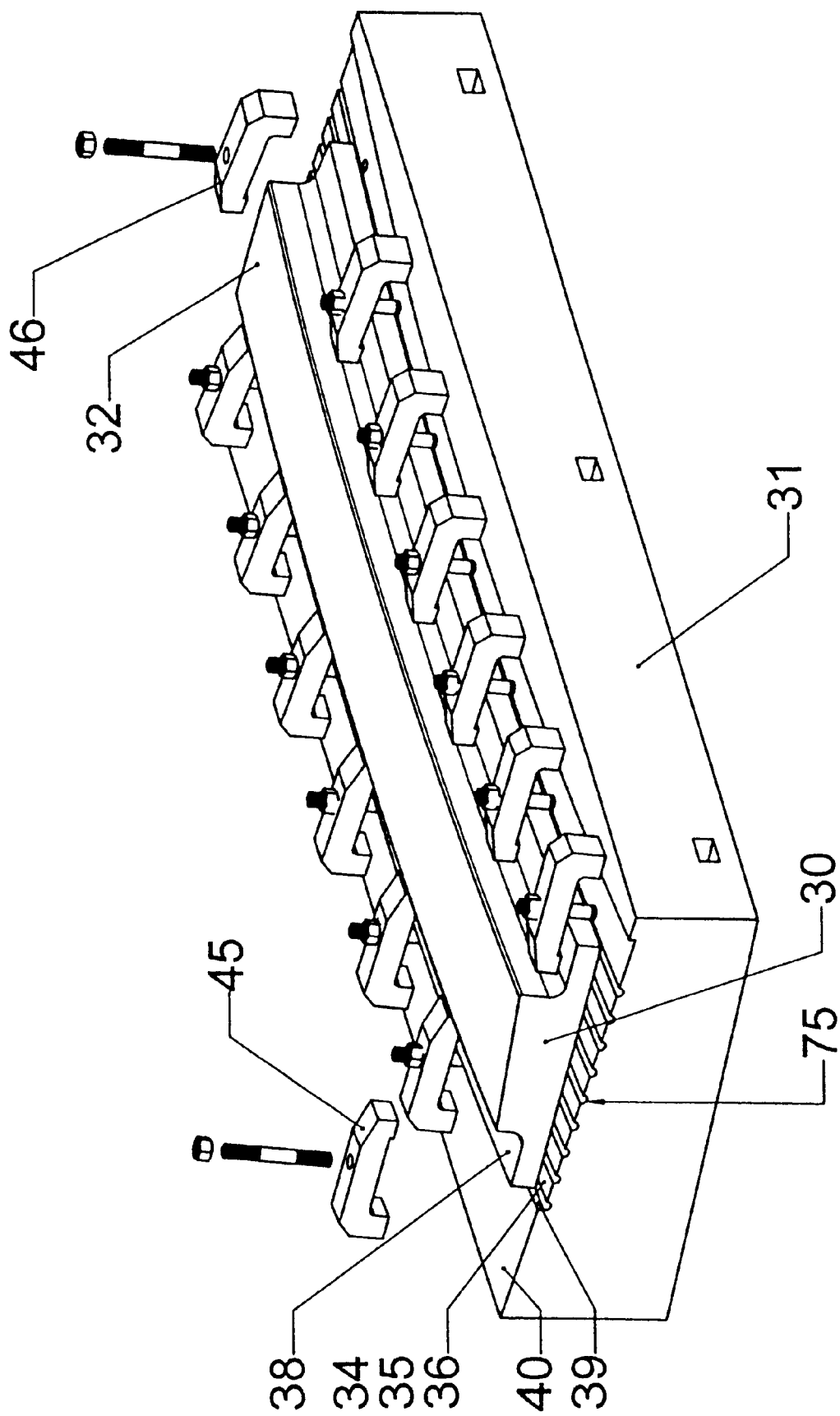
FIG. 3 which shows an angled view of a rail and jig insert.
Figure 4:
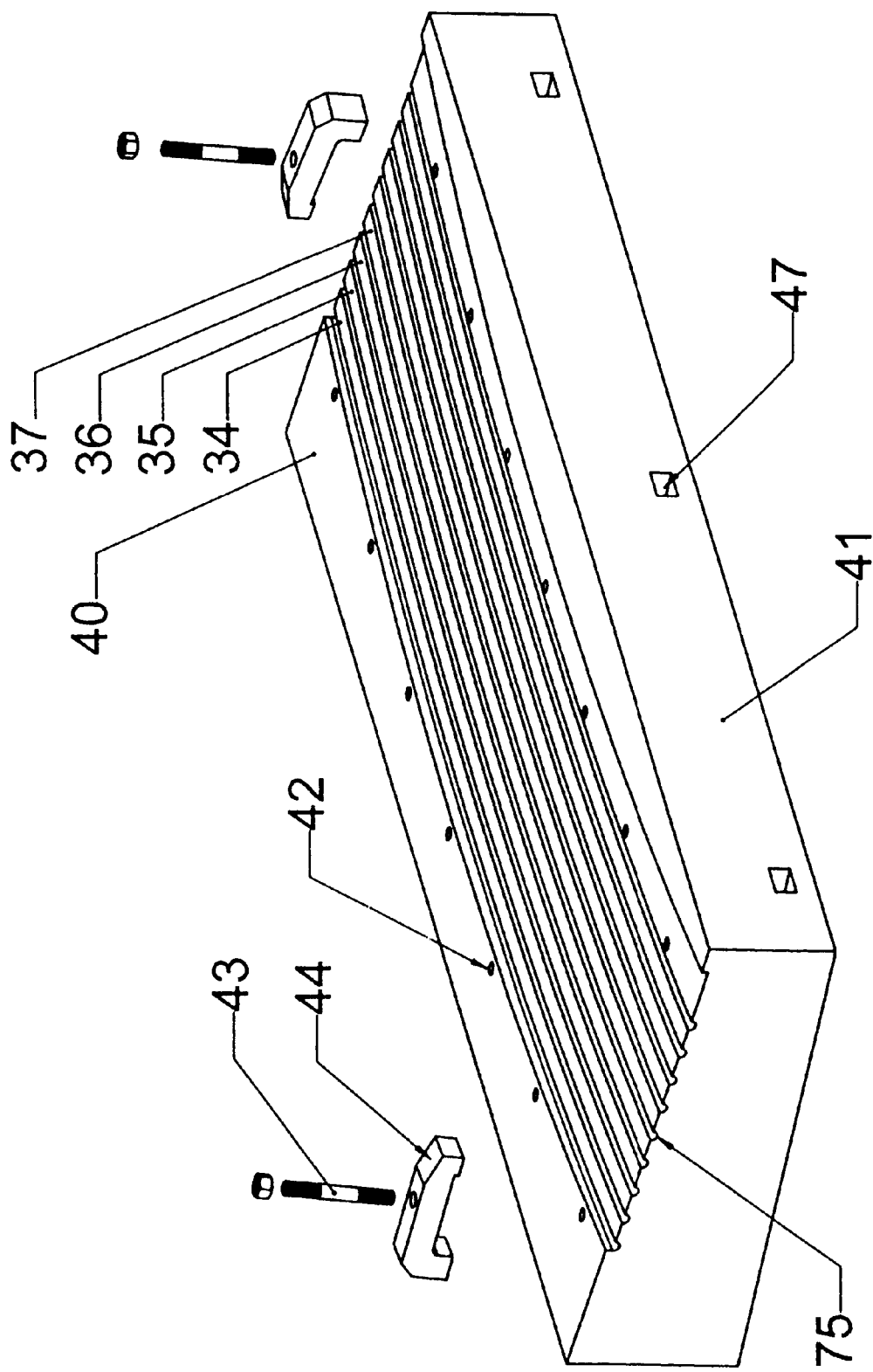
FIG. 4 which shows an angled view of the jig insert shown in FIG. 3.

A standardised jig base 31 is utilised and in FIGS. 3 and 4 the desired frusto-conical surface 21 shown in FIG. 2 is provided in segmented form by a series of concentric arcuate frusto conical surfaces 34, 35, 36 and 37. These arcuate segments are easy to machine accurately and together define parts of a continuous frusto-conical surface. In between each of the arcuate surfaces 34, 35, 36 and 37 stepped regions are provided.

It should be noted that a radial line coterminous with the upper face of arcuate segment 37 would also be coterminous with the upper surface of each of the other surfaces 34, 35 and 36.

When the rough machined bearing segment 30 is located on the jig base 34 so that its outermost flange 38 is abutting vertical wall 39 of the outer peripheral wall 40, its planar bottom base 33 contacts parts of each of the arcuate surfaces 34, 35, 36 and 37 along its arcuate length, as exemplified in FIG. 3.

The jig base 34 as shown in FIG. 4 is provided with concentric inner and outer peripheral walls 40, 41 with the arcuate segments located therebetween. In the upper face of each of these walls 40, 41 holes 42 are provided which are threaded internally so as to receive the lower end of threaded bolts 43. The holes 4 are preferably equally spaced around the arcuate length of each of the walls 40, 41.

Bolt 43 is adapted to be used with a clamping element 44 which is effectively a rectangular block element with a hole through its center. When the bolt 43 and clamping element 44 are combined with the lower end of bolt 43 screwed into one of the holes 42, turning of the bolt 43 can force the clamping element 44 to apply pressure to the adjacent flange of the bearing segment 30.

As shown in FIG. 3 one of the clamping elements 45 clamps the outermost flange 38 of the bearing segment and a clamping element 46 located on the inner peripheral wall 41 clamps the innermost flange of bearing segment 30.

By providing clamps at each of the holes 42 pressure is applied downwardly on the inner and outer flanges of the bearing segment and due to the resilience of the material from which the bearing segment is made (soft steel), the bearing segment 30 deforms so that the lowermost face 33 conforms to the profile of the segmented section of the jig base so that eventually each arcuate surface 34, 35, 36 and 37 is substantially in contact with adjacent face of the bearing segment 30.

It should be noted that grooves 75 of FIGS. 3, 4, 5 and 6 have two main purposes; (1) to allow ease of machining by the reduction of cutting width necessary during the final machining of the jig face; and (2) reduction of surface area contact to allow an accurate seating face.

At this stage the bearing segment has been generally deformed from its lower face 33 to its upper face 32 and the upper face 32 is ready for machining. Consequently the upper face 32 is machined so that it is substantially flat, that is parallel to a horizontal plane.

At this point it should be noted that the drawings are not accurate representations of the desired profiles. FIG. 3 for example shows an exaggerated frusto-conical profile for the jig base 34 and consequently the lower face 33 of the bearing segment as previously mentioned. Typically the frusto-conical surface of a slew bearing segment has a slope of around 1°. Consequently the same slope would be required for the segmented surfaces of the jig base 34.

Once the upper face 32 has been machined flat the clamps 45 and 46 can be released along the length of the jig base 34 so as to release clamping pressure from the inner and outer flanges of the bearing segment 30. When this occurs the lower face 33 of the bearing segment 30 springs back to assume its original planar profile. The upper face 32 however which has previously been machined flat (planar) now has a curved face corresponding to a frusto-conical profile the same as the inverse of that of the segmented section of the jig base 34.

In this context inverse means opposite but matching configuration.

The jig base 34 also has lateral slots 47 which allow the jig to be clamped to a fixed structure.

Figure 5:
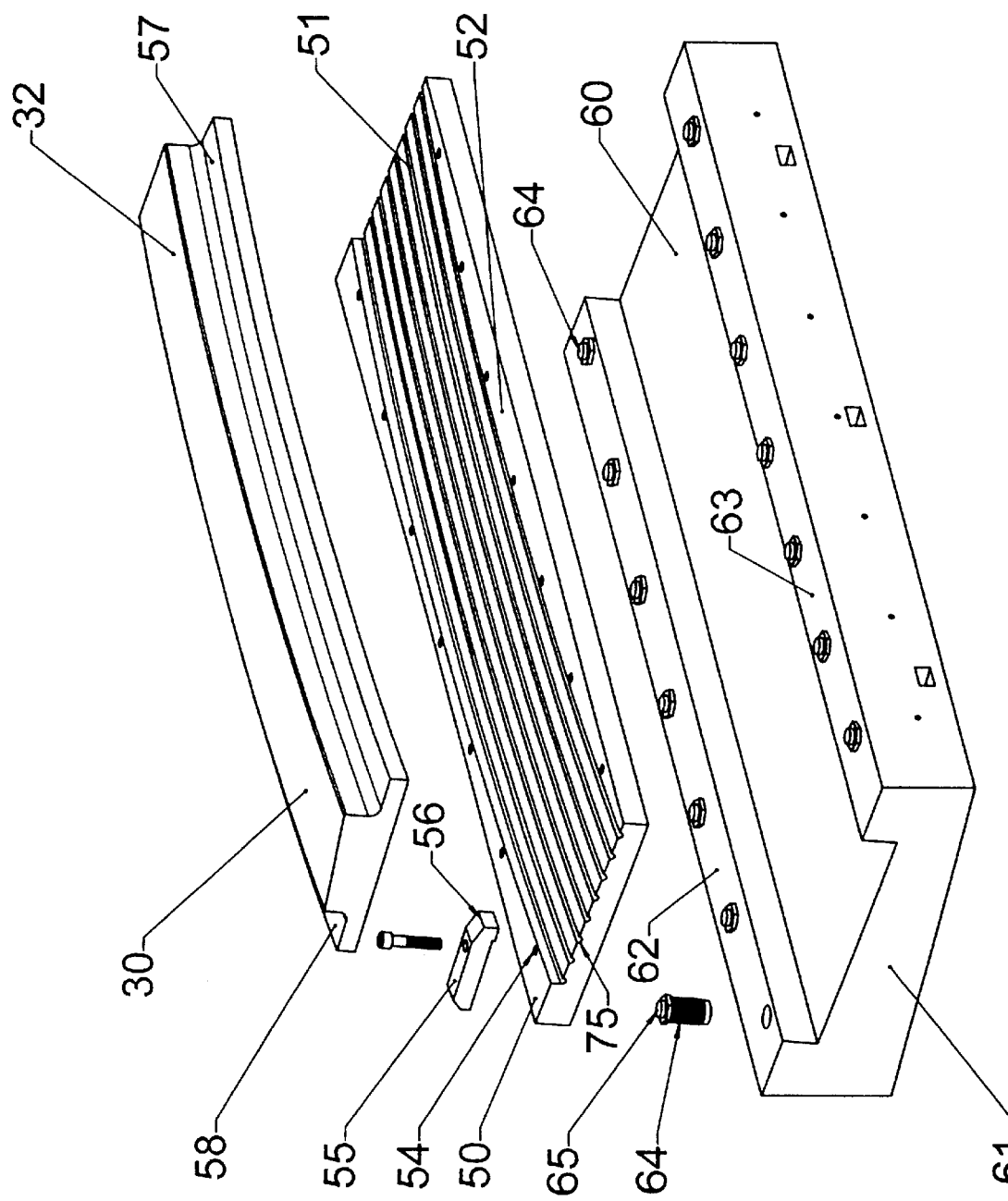
FIG. 5 which shows another embodiment of the invention incorporating a slew bearing rail, a conical jig insert and jig base.

FIG. 5 depicts a variation of the method previously described for producing a slew bearing segment having a frusto-conical upper face profile. Item 30 is a rough machined slew bearing segment as shown in FIG. 3, however the jig base 34 is replaced by a conical jig insert 50 having a channel 51 with inner and outer peripheral walls 52 and 53 respectively.

The channel 51 has an upper face which is machined so that it is the inverse of the desired profile for the upper face 32 of the slew bearing segment 30. According to one embodiment the channel 51 is a continuous frusto-conical surface rather than a series of arcuate segments which define parts of such a surface. As with the first embodiment holes 54 are provided for respective clamping devices 55.

The lateral clamping element 56 differs slightly from that of the first embodiment because it comprises a front clamping portion 56 which is adapted to clamp down on one of the side flanges 57, 58 of the slew bearing segment 30. The opposite end 59 of the clamping element 55 overhangs the associated peripheral wall 52, 53.

The conical jig insert 50 is located in a channel 60 of a jig base 61. The jig base 61 is provided with channel walls 62, 63 respectively which are designed to abut the corresponding peripheral walls 53, 52 of the conical jig insert 50.

The jig base 61 is provided with hydraulic cylinders 64 which are spaced at regular intervals outside the respective peripheral walls 62, 63 so as to be in alignment with the holes 54 of the conical jig insert 50. Pistons 65 are located in each of the hydraulic cylinders 64 and are operable to move upwardly so as to strike the underside of the overhanging end 59 of respective clamps 55.

When the slew bearing rail 30 is located in channel 51 of the conical jig insert 50 the clamps 55 are heightened so that the ends 56 press down on the adjacent portion of one of the flanges 57, 58. The hydraulic cylinders can be operated to raise piston 65 to act as a counter balance to any moment of force which is applied as a result of a reactionary force applied to the underside of end 56 of each clamp. Thus the piston 65 ensure even clamping force is applied to the slew bearing rail.

When the slew bearing rail 30, conical jig insert 50 and jig base 60 are firmly fixed together the upper face 32 of bearing rail can be machined flat. Once this has been achieved each of the clamps can be released and the slew bearing rail due to extra resilience returns to its original shape which results in the upper face 32 having the desired frusto-conical surface equivalent to that of the reference surface provided by channel 51 of the conical jig insert 50.

Figure 6:
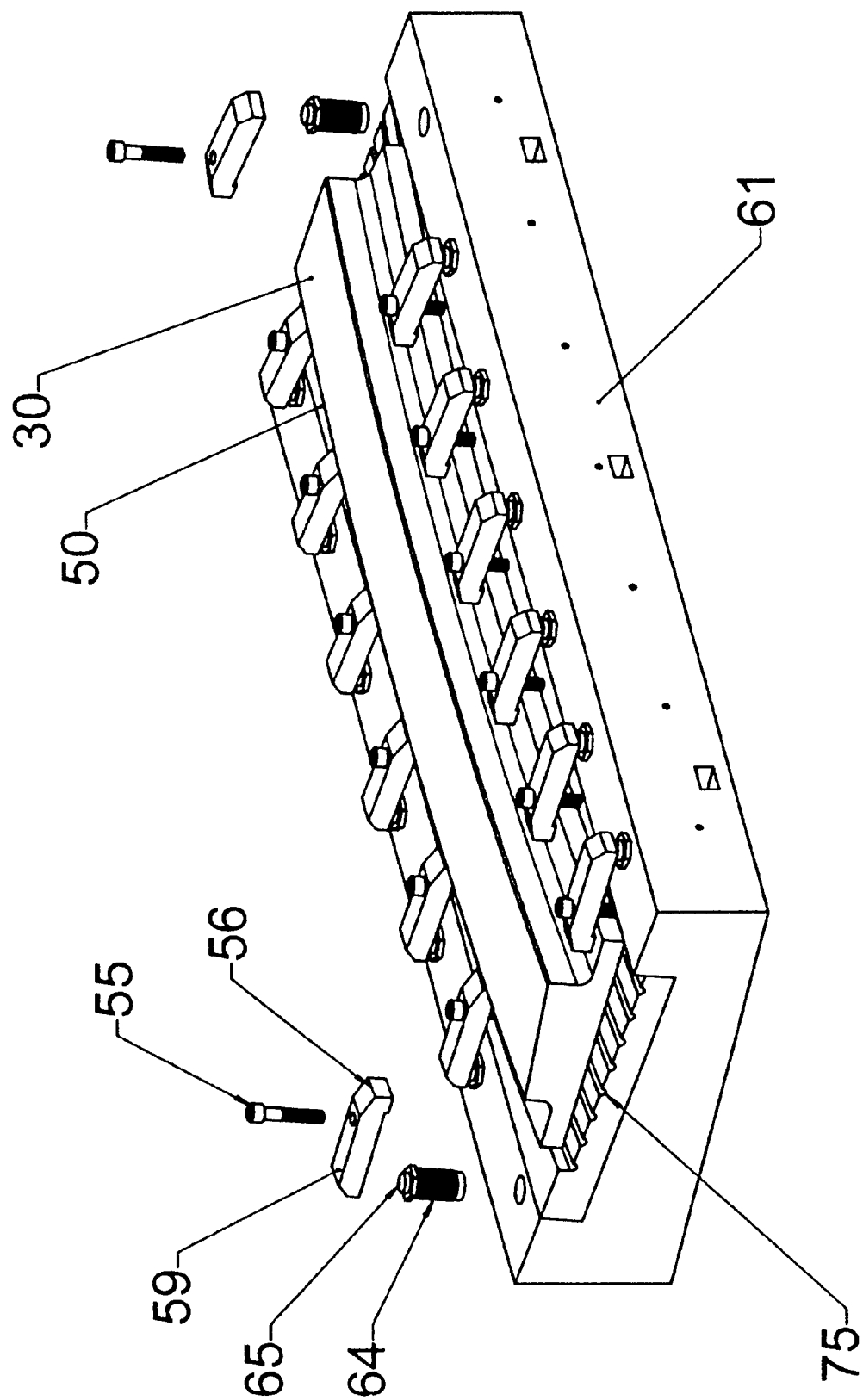
FIG. 6 which shows a cross sectional view of the combined component shown in FIG. 5.

FIG. 6 shows the slew bearing rail 30, conical jig insert 50 and jig base 61 clamped together by clamps 55. The figure is intended to show the lower face 33 of the slew bearing rail 30 being deformed in a matching conical form of the conical jig insert 50.

Figure 7:
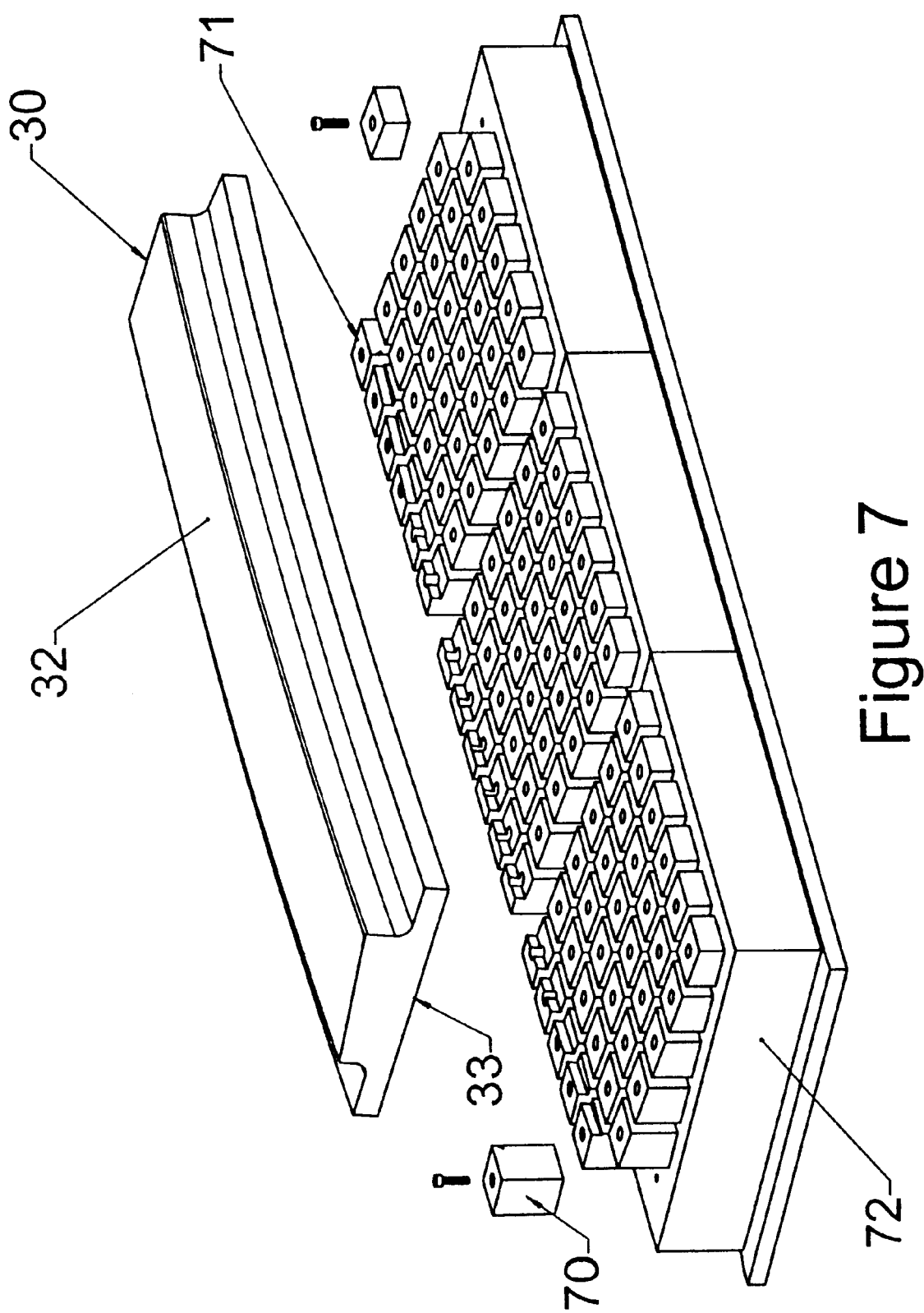
FIG. 7 which shows a further embodiment of the invention incorporating a slew bearing rail, conical magnetic transfer blocks and magnetic base.

FIG. 7 shows a further variation of the invention in which the conical jig insert 50 is replaced by a series of magnetic transfer blocks 70 which are connected together to form individual magnetic circuits which can attract the underside of the slew bearing rail 30. These transfer blocks 70 have their upper faces machined to the desired conical configuration as discussed in previous embodiments shown in FIGS. 1 to 6. The magnetic transfer blocks together form a transfer block assembly 71 which is positioned on a magnetic base 72. When the magnetic base 72 is connected to an electrical power source the magnetic transfer block assembly 71 is magnetised and lower face 33 on the slew bearing rail 30 is attracted to it and deforms to the matching face of the magnetic transfer block assembly 71.

With the slew bearing rail 30 firmly deformed and attracted to the magnetic transfer block assembly 71, the upper face 32 can be machined flat. Once electrical power to the magnetic base is removed the slew bearing rail is no longer attracted to the magnetic transfer block assembly 71 and the lower face 33 will regain its original flat bottom face.

At the same time the upper face 32 will now take the form of an accurate conical surface corresponding to that of the upper face of the magnetic transfer block assembly 71.

With the above described embodiments of the invention it is possible to accurately and repeatedly produce slew bearing segments having a desired upper surface profile. Furthermore, the time involved in obtaining the finished product is a drastic reduction on the time involved in making a similar conventional product.

I claim:

1. A method of machining an article including the steps of providing a resilient article having a lower face with a predetermined profile and an upper face;

providing a reference article having an upper face with a reference profile, the reference article also having locating means which maintain the resilient article in a predetermined orientation on the upper face;

abutting at least part of the lower face of the resilient article against the reference article upper face, and using the locating means to maintain the resilient article in a predetermined configuration;

applying force to resiliently deform the resilient article a predetermined amount whereby the lower face of the resilient article substantially conforms to the shape of the reference article upper face;

machining the upper face of the resilient article to a predetermined configuration; and releasing the force applied to deform the resilient article whereby the upper face of the resilient article springs back to adopt a desired configuration.

2. A method as claimed in claim 1, wherein the resilient article lower face is provided with a substantially planar profile.

3. A method of machining a segment of a main slew bearing for a dragline which has a diameter of fifteen feet or more, the method including the steps of providing a rough machined segment of a main slew bearing having a lower face with a predetermined profile and an upper face;

providing a reference article having an upper face with a reference profile, the upper face having a plurality of step surfaces which support the segment of a main slew bearing on the corner of each step;

abutting at least part of the lower face against the reference article upper face;

applying force to resiliently deform the segment of a main slew bearing a predetermined amount until the lower face of the segment of a main slew bearing substantially conforms to the shape of the reference article upper face;

machining the upper face of the segment of the main slew bearing to a predetermined configuration; and releasing the force applied to deform the segment of the main slew bearing whereby the upper face of the segment of the main slew bearing springs back to a desired configuration.

4. A method as claimed in claim 2, wherein the reference article is provided with clamping means for applying the force to resiliently deform the resilient article when the resilient article is clamped to the upper face of the reference article.

5. A method as claimed in claim 4, wherein the clamping means are provided with shoulder portions on opposite sides of the upper face.

6. A method as claimed in claim 5, wherein the resilient article is an elongate member provided with longitudinal side flange portions which are engaged by the clamping means.

7. A method as claimed in claim 6, wherein the upper face is narrower than the lower face.

8. A method as claimed in claim 1 wherein the reference profile is continuous.

9. A method as claimed in claim 6, wherein the locating means are provided with side walls adapted to receive the clamping means for clamping the side flange portions.

10. A method as claimed in claim 9, wherein the clamping means are provided with a plurality of clamps located on each side wall and distributed to apply the force to the resilient article at intervals along the length thereof.

11. A method as claimed in claim 10, wherein the upper face of the reference article is provided with a substantially arcuate profile.

12. A method as claimed in claim 10, wherein the upper frame of the reference article is provided with a substantially frusto-conical profile.

13. A method as claimed in claim 12, in which the step of releasing the force applied to deform the resilient article results in the upper face of the resilient article springing back to a configuration substantially the same as the inverse of that defined by the upper face of the reference article.

14. A method as claimed in claim 3, wherein each corner of the plurality of the step surfaces together define points on a curve.

15. A method as claimed in claim 14, wherein the step surfaces are arcuate.

16. A method as claimed in claim 15, wherein the upper face defines a frusto-conical surface.

17. A method as claimed in claim 16, wherein the side walls comprise upper and lower side walls.

18. A method as claimed in claim 17, wherein the top surface of each side wall comprises threaded holes for receipt of shafts of clamps used to apply the force to resiliently deform the segment of a main slew bearing.

19. A method as claimed in claim 18 wherein the upper face of the reference article has a curvature of approximately 1°.

20. A method as claimed in claim 19, including the step of providing a base member to support the reference article.

21. A method as claimed in claim 20, wherein the base member comprises a channel configured to receive the base of the reference article whereby the reference article can be seated within the channel.

22. A method as claimed in claim 21, wherein the method comprises the step of abutting the lower face of the segment of a main slew bearing against edges of the arcuate step surfaces.

* * * * *